(12) United States Patent
Lenhert et al.

(10) Patent No.: US 11,460,112 B2
(45) Date of Patent: Oct. 4, 2022

(54) POLYMER SEAL ASSEMBLY

(71) Applicant: SAINT-GOBAIN PERFORMANCE PLASTICS CORPORATION, Solon, OH (US)

(72) Inventors: Jon M. Lenhert, Brea, CA (US); Robert T. Racicot, Murrieta, CA (US); Kha V. Le, Fountain Valley, CA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 201 days.

(21) Appl. No.: 16/286,003

(22) Filed: Feb. 26, 2019

(65) Prior Publication Data

US 2019/0257429 A1    Aug. 22, 2019

Related U.S. Application Data

(62) Division of application No. 14/755,407, filed on Jun. 30, 2015, now Pat. No. 10,260,634.
(Continued)

(51) Int. Cl.
*F16J 15/3284* (2016.01)
*F16J 15/3212* (2016.01)
(Continued)

(52) U.S. Cl.
CPC ......... *F16J 15/3284* (2013.01); *F16J 15/166* (2013.01); *F16J 15/181* (2013.01);
(Continued)

(58) Field of Classification Search
CPC ........ F16J 15/3216; F16J 15/322; F16J 15/06; F16J 15/3208; F16J 15/3252;
(Continued)

(56) References Cited

U.S. PATENT DOCUMENTS 2,804,324 A * 8/1957 Stallings ............... F16J 15/3284
277/569
2,804,325 A * 8/1957 Riesing ................ F16J 15/3244
277/559
(Continued)

FOREIGN PATENT DOCUMENTS

CN   102598892 A   7/2012
CN   102667268 A   9/2012
(Continued)

OTHER PUBLICATIONS

MatWeb—Material Property Data, Saint-Gobain Fluoroloy A22 High Performance Seal Material, «http://www.matweb.com/search/datasheet.aspx?matguid=91e7b477396d4b0ba4dca5f284cc2b50&ckck=1», printed Jun. 3, 2014, 2 pages.
(Continued)

*Primary Examiner* — Eugene G Byrd
(74) *Attorney, Agent, or Firm* — Abel Schillinger, LLP; David G Miranda

(57) ABSTRACT

A seal assembly includes a seal body, a spring disposed adjacent to the seal body, and a seal ring disposed adjacent to the seal body. The seal body and the seal ring can include a plastic polymer material. The seal assembly can be a subcomponent of hydraulic strut in the landing gear of an aircraft.

17 Claims, 2 Drawing Sheets

Related U.S. Application Data

(60) Provisional application No. 62/022,480, filed on Jul. 9, 2014.

(51) Int. Cl.
    *F16J 15/3236* (2016.01)
    *F16J 15/16* (2006.01)
    *F16J 15/18* (2006.01)
    *F16J 15/20* (2006.01)

(52) U.S. Cl.
    CPC .......... *F16J 15/20* (2013.01); *F16J 15/3212* (2013.01); *F16J 15/3236* (2013.01)

(58) Field of Classification Search
    CPC .... F16J 15/3236; F16J 15/3284; F16J 15/166; F16J 15/181; F16J 15/3212
    See application file for complete search history.

(56) References Cited

U.S. PATENT DOCUMENTS

| | | | |
|---|---|---|---|
| 2,907,596 A * | 10/1959 | Maha | F16J 15/3232 277/566 |
| 2,927,830 A * | 3/1960 | Workman | F16J 15/3236 92/194 |
| 2,997,318 A * | 8/1961 | Lansky | F16J 15/166 277/558 |
| 3,094,904 A * | 6/1963 | Healy | F16J 15/3212 92/241 |
| 3,642,290 A * | 2/1972 | Millsap | F16J 15/3208 277/551 |
| 4,053,166 A * | 10/1977 | Domkowski | F16J 15/166 277/558 |
| 4,103,909 A * | 8/1978 | Hoffman | F16J 15/3236 251/214 |
| 4,133,542 A * | 1/1979 | Janian | F16J 15/3212 277/555 |
| 4,244,192 A * | 1/1981 | Chellis | F04B 39/042 277/438 |
| 4,268,045 A * | 5/1981 | Traub | F16F 9/363 277/589 |
| 4,537,422 A * | 8/1985 | O'Rourke | F16F 9/365 188/297 |
| 4,576,386 A | 3/1986 | Benson et al. | |
| 4,592,558 A * | 6/1986 | Hopkins | F16J 15/3236 277/530 |
| 4,601,235 A * | 7/1986 | Roberts | F04B 53/143 277/437 |
| 4,618,154 A | 10/1986 | Freudenthal | |
| 4,706,970 A * | 11/1987 | Ramirez | F16J 15/3236 277/556 |
| 4,709,930 A * | 12/1987 | Forch | F16J 15/3244 277/430 |
| 4,743,033 A * | 5/1988 | Guess | E21B 33/126 166/319 |
| 4,893,823 A * | 1/1990 | Strouse | F16J 15/166 277/437 |
| 5,163,692 A * | 11/1992 | Schofield | F16J 15/3236 277/436 |
| 5,183,271 A * | 2/1993 | Wada | F16J 15/3244 277/351 |
| 5,306,021 A * | 4/1994 | Morvant | F16J 15/3232 277/530 |
| 5,738,358 A * | 4/1998 | Kalsi | F16J 15/3224 277/544 |
| 5,799,953 A * | 9/1998 | Henderson | F16J 15/3236 277/554 |
| 5,860,656 A * | 1/1999 | Obata | F16J 15/3232 277/549 |
| 5,979,904 A * | 11/1999 | Balsells | F16J 15/3236 277/554 |
| 6,076,645 A * | 6/2000 | Winkelmann | F16D 25/083 192/85.54 |
| 6,419,236 B1 * | 7/2002 | Janian | F16J 15/3212 277/553 |
| 6,547,250 B1 * | 4/2003 | Noble | F04B 53/143 277/309 |
| 7,021,632 B2 * | 4/2006 | Grace | F16J 15/3236 156/196 |
| 7,090,222 B2 * | 8/2006 | Watanabe | F16J 15/006 277/549 |
| 7,172,201 B2 * | 2/2007 | Uhrner | F16J 15/3228 277/551 |
| 7,341,258 B2 | 3/2008 | Holt et al. | |
| 7,753,376 B2 * | 7/2010 | Kondo | F16J 15/3216 277/553 |
| 7,798,496 B2 * | 9/2010 | Dietle | F16J 15/3208 277/551 |
| 7,959,159 B2 * | 6/2011 | Hocker | F02M 59/442 277/559 |
| 8,123,229 B2 * | 2/2012 | Eguchi | F16J 15/3236 277/558 |
| 8,256,772 B2 * | 9/2012 | Itadani | F16J 15/322 277/353 |
| 8,544,850 B2 | 10/2013 | Balsells et al. | |
| 8,714,560 B2 | 5/2014 | Faas | |
| 2002/0089124 A1 * | 7/2002 | Hosokawa | F16J 15/3228 277/551 |
| 2003/0160395 A1 * | 8/2003 | Walden | F16J 15/3236 277/584 |
| 2006/0066058 A1 | 3/2006 | Holt et al. | |
| 2006/0145426 A1 | 7/2006 | Schroeder et al. | |
| 2006/0214379 A1 * | 9/2006 | James | F16J 15/166 277/404 |
| 2007/0180987 A1 * | 8/2007 | An | F16J 15/3236 92/165 R |
| 2007/0194538 A1 * | 8/2007 | Munekata | F16J 15/322 277/551 |
| 2007/0222162 A1 | 9/2007 | Stoner | |
| 2008/0029264 A1 | 2/2008 | Williams et al. | |
| 2009/0250881 A1 * | 10/2009 | Dietle | F16J 15/3244 277/559 |
| 2009/0289418 A1 | 11/2009 | Cook | |
| 2010/0219592 A1 | 9/2010 | Tuckness et al. | |
| 2010/0237566 A1 * | 9/2010 | Balsells | F16J 15/3232 277/550 |
| 2011/0037234 A1 * | 2/2011 | Balsells | F16J 15/3232 277/562 |
| 2011/0079962 A1 | 4/2011 | Munro | |
| 2011/0140369 A1 | 6/2011 | Lenhert | |
| 2011/0260411 A1 | 10/2011 | Smith | |
| 2011/0285095 A1 | 11/2011 | Okuma et al. | |
| 2012/0286478 A1 | 11/2012 | Uesugi et al. | |
| 2013/0043661 A1 | 2/2013 | Binder et al. | |
| 2014/0361492 A1 | 12/2014 | Lenhert | |
| 2014/0361494 A1 | 12/2014 | Lenhert | |
| 2016/0018002 A1 | 1/2016 | Lenhert et al. | |

FOREIGN PATENT DOCUMENTS

| | | | | |
|---|---|---|---|---|
| WO | WO-2007066503 A1 * | 6/2007 | .......... | F16J 15/3236 |
| WO | WO-2008029786 A1 * | 3/2008 | .............. | F16J 15/56 |
| WO | 2009142986 A2 | 11/2009 | | |
| WO | 2011072192 A2 | 6/2011 | | |

OTHER PUBLICATIONS

Saint-Gobain Performance Plastics Seals, Fluoroloy A30, «http://www.seals.saint-gobain.com/fluoroloy-a30.aspx», dated 2004, 1 page.

Saint-Gobain Performance Plastics, OmniSeal Handbook—Reliability That Withstands the Test of Time, «www.omniseal.com», «http://www.oilandgas.saint-gobain.com/uploadedFiles/SGoilandgas/Documents/Seals/OmniSeal-Brochure-US0207.pdf», BST-4075-3M-1107-SGCS, dated 2007, 27 pages.

European Search Report for European Application No. 15175495.9 dated Mar. 8, 2016, 1 page.

* cited by examiner

POLYMER SEAL ASSEMBLY

CROSS-REFERENCE TO RELATED APPLICATION(S)

This application is a divisional and claims priority under 35 U.S.C. § 120 to U.S. patent application Ser. No. 14/755,407 entitled, "POLYMER SEAL ASSEMBLY," by Lenhert et al., filed Jun. 30, 2015, which application claims priority under 35 U.S.C. § 119(e) to U.S. Provisional Application No. 62/022,480 entitled "POLYMER SEAL ASSEMBLY," by Lenhert et al., filed Jul. 9, 2014, of which all are assigned to the current assignee hereof and incorporated herein by reference in their entireties.

FIELD OF THE DISCLOSURE

The present disclosure relates in general to seals and, in particular, to improved systems, methods, and apparatuses for a spring-energized polymer dynamic seal assembly.

RELATED ART

Dynamic seals for linear motion rods or cylinders that are used in hydraulic service prevent the loss of hydraulic fluid from the system and the intrusion of foreign particles between the moving parts. Conventional dynamic seals used, for example, as a subcomponent of the landing gear of an aircraft typically comprise elastomers for its deformability and resilience. However, elastomers wear quickly and are prone to tear, thus requiring frequent replacement. In addition elastomers can become hard, stiff, and brittle when exposed to low temperatures and, thus, can malfunction. Thus, a need exists for an improved linear dynamic seal.

BRIEF DESCRIPTION OF THE DRAWINGS

Embodiments are illustrated by way of example and are not limited in the accompanying figures.

Figure 1:
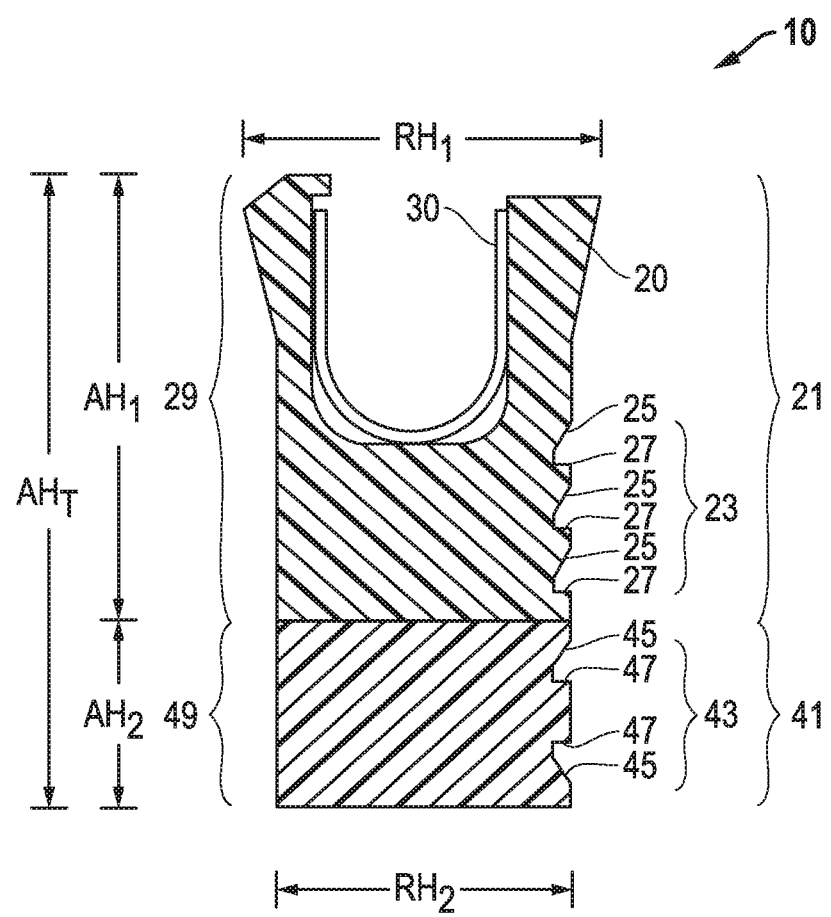
FIG. 1 includes an illustration of cross-section of an embodiment of the seal assembly described herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

Embodiments of the seal assembly according to the present disclosure are more durable than a conventional elastomer seal assembly. In addition, embodiments of the seal assembly described herein can have an improved sealing capacity as compared to a conventional seal assembly. The concepts are better understood in view of the embodiments described below that illustrate and do not limit the scope of the present invention Referring now to FIG. 1, in certain embodiments, the seal assembly 10 can comprise a radial seal assembly. In particular embodiments, the seal assembly 10 can comprise three components: a seal body 20, a spring 30 disposed adjacent to the seal body 20, and a seal ring 40 disposed adjacent to the seal body 20. In other embodiments, the seal assembly can include only the seal body 20 and the spring 30.

The seal body 20 can have an annular shape that is concentric with the spring 30 and the seal ring 40. The seal body 20 can have a first portion having a generally rectangular cross-section and a second portion having a generally U-shaped cross-section. The seal body 20 can have a major surface 21 adapted to face a shaft or rod such that at least a portion of the major surface 21 engages with the shaft or rod surface to form a seal.

The major surface 21 can define an inner diameter of the seal body 20. In certain embodiments, the seal body 20 can have an inner diameter $ID_1$ of at least 80 mm, at least 85 mm, or at least 90 mm. In further embodiments, the seal body 20 can have an inner diameter $ID_1$ of no greater than 150 mm, no greater than 125 mm, or no greater than 115 mm. In yet further embodiments, the seal body 20 can have an inner diameter $ID_1$ in a range of any of the above maximum or minimum values, such as in a range of 80 to 150 mm, 85 to 125 mm, or 90 to 115 mm.

The major surface 21 can include at least one seal groove 23 that extends radially along the major surface 21 of the seal body 20. In certain embodiments, the at least one seal groove 23 can have opposing asymmetric sidewalls 25, 27 that extend into the thickness of the seal body 20. In particular embodiments, the major surface 21 of the seal body 20 can include a plurality of repeating seal grooves 23, each having opposing asymmetric sidewalls 25, 27 that extend into the thickness of the seal body 20.

The seal body 20 can include a major surface 29 that is opposed to the major surface 21 and defines an outer diameter of the seal body 20. The distance between the major surface 21 and the major surface 29 can be referred to as the radial height $RH_1$ of the seal body 20. In certain embodiments, the seal body 20 can have a radial height $RH_1$ of at least 1 mm, at least 2 mm, or at least 4 mm. In further embodiments, the seal body 20 can have a radial height $RH_1$ of no greater than 12 mm, no greater than 10 mm, or no greater than 8 mm. In yet further embodiments, the seal body 20 can have a radial height $R_{H1}$ in a range of any of the above minimum and maximum values, such as in a range of 1 to 12 mm, 2 to 10 mm, or 4 to 8 mm.

In certain embodiments, the seal body 20 can have an $RH_1:ID_1$ ratio of at least 1:30, at least 1:25, at least 1:20, or at least 1:15. In further embodiments, the seal body can have an $RH_1:ID_1$ ratio of no greater than 1:5, no greater than 1:7, or no greater than 1:10. In yet further embodiments, the seal body can have an $RH_1:ID_1$ ratio in a range of any of the above minimum and maximum values, such as in a range of 1:30 to 1:5, 1:25 to 1:7, or 1:20 to 1:10.

The seal body 20 can include a contact surface 24 that can define an axial end of the seal body. In certain embodiments, the contact surface 24 can be adapted to contact the seal ring 40. In particular embodiments, the seal body 20 and the seal ring 40 are not adhered to each other, but are separate components.

In certain embodiments, the contact surface 24 can be a substantially flat surface. In a particular embodiment, the contact surface 24 can lie along a plane that is substantially orthogonal to a central axis of the seal body 20. As illustrated in FIG. 1, the at least one seal groove 23 discussed previously can be located in a region near the contact surface 24.

The axial height $AH_1$ of the seal body 20 can be defined as the maximum distance from the contact surface 24 to the opposing axial end of the seal body 20. In certain embodiments, the seal body 20 can have an axial height $AH_1$ of at least 2 mm, at least 4 mm, or at least 6 mm. In further embodiments, the seal body 20 can have an axial height $AH_1$ of no greater than 14 mm, no greater than 12 mm, or no greater than 10 mm. In yet further embodiments, the seal body 20 can have an axial height $AH_1$ in a range of any of the above minimum and maximum values, such as in a range of 2 to 14 mm, 4 to 12 mm, or 6 to 10 mm.

In certain embodiments, the total axial height $AH_T$ of the seal assembly 10 can be equal to the sum of the axial height $AH_1$ of the seal body 20 and the axial height $AH_2$ of the seal ring 40, and seal ring 40 will be described in more detail later. In other embodiments, such as, for example, where the seal assembly 10 does not include the seal ring 40, the total axial height $AH_T$ of the seal assembly 10 is equal to the axial height $AH_1$ of the seal body 20. In particular embodiments, the seal assembly can have a total axial height $AH_T$ of at least 6 mm, at least 7 mm, at least 8 mm, or at least 9 mm. In further embodiments, the total axial height $AH_T$ of the seal assembly is no greater than 20 mm, no greater than 15 mm, or no greater than 11 mm. In yet further embodiments, the total axial height $AH_T$ of the seal assembly can be in a range of any of the above minimum and maximum values, such as in a range of 6 to 20 mm, 7 to 15 mm, or 8 to 11 mm.

The seal body 20 can be formed of a polymer material. In certain embodiments, the polymer material can include a plastic polymer material. In particular embodiments, the seal body 20 can be a plastic-based seal body, separate and distinct from an elastomer-based seal. For example, the seal body 20 can be free of a silicone elastomer or free of any elastomer. As used herein, a plastic polymer material is distinct from and does not encompass an elastomer material. An elastomer material is a natural or synthetic polymer, e.g. rubber, recognized for its viscoelastic properties.

For example, the plastic polymer material can have a Young's Modulus of at least 150 MPa, at least 200 MPa, at least 250 MPa, or at least 300 MPa. The plastic polymer material may have a Young's Modulus of no greater than 1500 MPa, no greater than 1000 MPa, or no greater than 800 MPa. The plastic polymer material can have a Young's Modulus in the range of any of the above minimums and maximums, such as in a range of 150 to 1500 MPa, 200 to 1000 MPa, or 300 to 800 MPa.

In certain embodiments, the seal body 20 can have a Shore D Hardness of at least 50, at least 55, or at least 60. In further embodiments, the seal body 20 can have a Shore D Hardness of no greater than 75, no greater than 73, or no greater than 70. In yet further embodiments, the seal body 20 can have a Shore D Hardness in a range of any of the above minimum and maximum values, such as 50 to 75, 55 to 73, or 60 to 70.

The plastic polymer material can include a nylon, a fluoroplastic, a polybenzimidazole (PBI), a polyether ether ketone (PEEK), a polyaryletherketone (PAEK), a polyimide (PI), or any combination thereof. In a particular embodiment, the polyimide can include a polyetherimide (PEI). In another particular embodiment, the plastic polymer material can include a fluoroplastic. The fluoroplastic can include a polytetrafuoroethylene (PTFE), a perfluoroalkoxy (PFA), a fluorinated ethylene propylene (FEP), a modified PTFE (TFM), an ethylene tetrafluoroethylene (ETFE), a polychlorotrifluoroethene (PCTFE), or any combination thereof. In certain embodiments, the polymer material can include a liquid crystal polymer.

Conventionally, elastomer based seals have been required for certain applications, such as the hydraulic strut of an aircraft landing gear, that include a seal with a large radial height relative to its inner diameter. The seal assembly is conventionally installed via the low pressure/atmospheric side of the hydraulic strut. However, hydraulic struts can include several grooves and sharp edges in the bore on the low pressure/atmospheric side of the hydraulic strut, adjacent the groove where the seal is to be installed. Plastic polymer based seals in applications having the above radial height to inner diameter ratio were conventionally considered too stiff to manipulate in the narrow bore to bypass the grooves and sharp edges, and install without causing damage to the seal. Still, the deformation and resilience of elastomer based seals allow for large radial height seal bodies to be manipulated in the narrow bore and bypass the grooves and sharp edges with minimal damage. However, the load/deflection and glass transition characteristics of elastomers do not make optimal seals for certain dynamic seal applications, such as hydraulic struts for aircraft landing gear. Elastomers can shrink and/or become brittle when an aircraft is at a cruising altitude of, e.g., 35,000 feet because of the low temperatures, e.g. less than −40° C. When the aircraft descends in an attempt to land, there may not be sufficient time for the elastomer to return to its elastic state necessary for proper operation of the landing gear before the aircraft needs to land. In addition, an elastomer can deform under intense pressure such that it can be difficult to keep the seal on the shaft at all times, increasing the leakage rate of the seal. Also, elastomers can be prone to tearing or high wear rates, increasing leakage rate and frequency of replacement.

Applicants have concurrently developed unique installation methods and tooling that allow for installation of a seal body including a plastic polymer material that limits or avoids such damage during installation. Accordingly, another aspect of the present disclosure is directed to a method of installing a seal body, which will be described later in this disclosure.

As stated previously, the seal assembly 10 can include components in addition to the seal body 20. For example, as illustrated in FIG. 1, the seal body 20 can include a spring 30 adjacent to the seal body 20, such as disposed in the seal body 20, such as disposed in the second portion of the seal body 20 having a U-shaped cross-section. The spring 30 can be adapted to bias a radial portion of the seal body 20 into radial contact with a housing and to bias another radial portion of the seal body 20 into radial contact with a shaft for providing a dynamic seal therebetween.

In certain embodiments, the spring 30 can be disposed in an annular opening of the seal body 20 in an axial direction. In particular embodiments, the spring 30 can have an apex that abuts an inner, concave surface the annular opening of the seal body 20. The spring 30 can be generally free of direct contact with the seal ring 40.

In certain embodiments, the spring can include a metal material. In particular embodiments, the spring can be die-formed from an overlapped metal strip and configured with U-shaped cantilevers.

Figure 2:
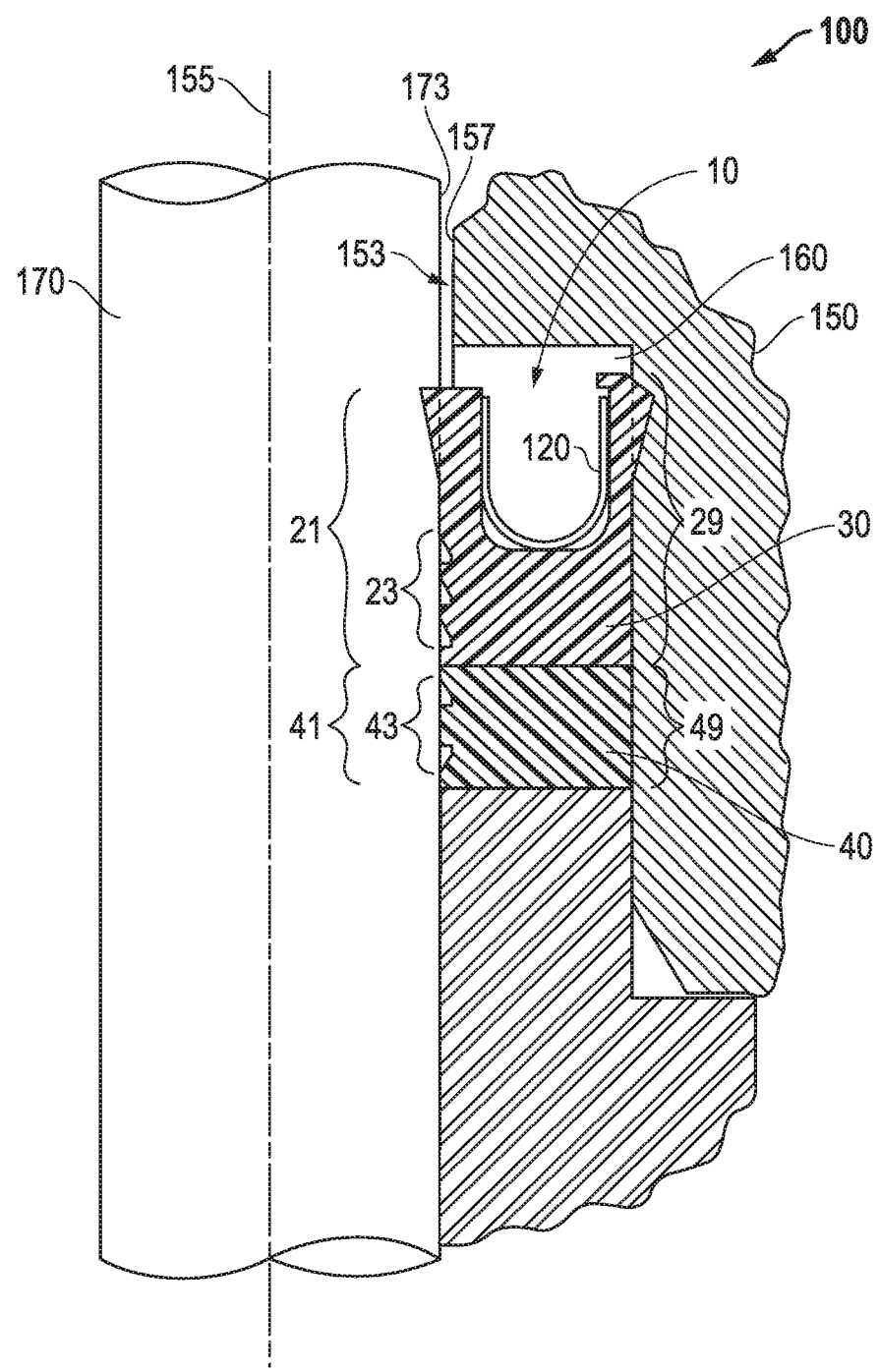
FIG. 2 includes an illustration of a cross-section of an embodiment of a system for linear movement described herein.

Further, another component of the seal assembly 10 can include a seal ring 40 disposed adjacent to the contact surface 24 of the seal body 20. In certain embodiments, the seal ring 40 can be concentric with the seal body 20. As illustrated in FIGS. 1 and 2, the seal ring 40 can have a generally rectangular cross-section. The cross-section of the seal ring 40 can have other shapes depending on the intended application.

In certain embodiments, the seal ring 40 can have a major surface 41 that can engage, or be adapted to engage a shaft or rod to form a seal. The major surface 41 can define an inner diameter $ID_2$ of the seal ring 40. In certain embodiments, the seal ring can have an inner diameter $ID_2$ of at least 80 mm, at least 85 mm, at least 90 mm. In further embodiments, the seal ring 40 can have an inner diameter $ID_2$ of no greater than 150 mm, no greater than 125 mm, or no greater than 115 mm. In even further embodiments, the seal ring 40 can have an inner diameter $ID_2$ in a range of any of the above minimum and maximum values, such as in a range of 80 to 150 mm, 85 to 125 mm, or 90 to 115 mm. The inner diameter $ID_2$ of the seal ring 40 can be the same as or different than the inner diameter $ID_1$ of the seal body 20. In certain embodiments, $ID_1$ is substantially the same as $ID_2$.

The seal ring 40 can include a major surface 49 that is opposed to the major surface 41 and defines an outer diameter of the seal ring 40. The distance between the major surface 41 and the major surface 49 can be referred to as the radial height $RH_2$ of the seal ring 40. In certain embodiments, the seal ring 40 can have a radial height $RH_2$ of at least 1 mm, at least 2 mm, or at least 4 mm. In further embodiments, the seal ring 40 can have a radial height $RH_2$ of no greater than 12 mm, no greater than 10 mm, or no greater than 8 mm. In yet further embodiments, the seal ring 40 can have a radial height $RH_2$ in a range of any of the above maximum and minimum values, such as in a range of 1 to 12 mm, 2 to 10 mm, or 4 to 8 mm. The radial height $RH_2$ of the seal ring 40 can be the same or different than the radial height $RH_1$ of the seal body 20. In a particular embodiment, $RH_2$ can be substantially the same as $RH_1$.

The major surface 41 can include at least one seal ring groove 43 that extends radially along the major surface 41 of the seal ring 40. In certain embodiments, the at least one seal ring groove 43 can have opposing asymmetric sidewalls 45, 47 that extend into the thickness of the seal ring 40. In particular embodiments, the major surface 41 can include a plurality of seal ring grooves, each having asymmetric sidewalls 45, 47 that extend into the thickness of the seal ring 40. In a more particular embodiment, each of the plurality of seal ring grooves 43 can have bilateral symmetry with each other.

In certain embodiments, the seal ring 40 can have a contact surface 44 that faces, abuts, or even directly contacts the contact surface 24 of the seal body 20. In particular embodiments, the contact surface 44 of the seal ring 40 can be substantially orthogonal to a central axis of the seal ring 40. The contact surface 44 of the seal ring 40 can have substantially the same dimensions as the contact surface 24 of the seal body.

The axial height $AH_2$ of the seal ring 40 can be defined as the maximum distance from the contact surface 44 to the opposing axial end of the seal ring 40. In certain embodiments, the seal ring 40 can have an axial height $A_{H2}$ of at least 1 mm, at least 1.5 mm, or at least 2 mm. In further embodiments, the seal ring 40 can have an axial height $AH_2$ of no greater than 6 mm, no greater than 5 mm, or no greater than 4 mm. In yet further embodiments, the seal ring 40 can have an axial height $AH_2$ in a range of any of the above maximum and minimum values, such as in a range of 1 to 6 mm, 1.5 to 5 mm, or 2 to 4 mm.

The seal ring 40 can include a plastic polymer material. The plastic polymer material can include one or more of the plastic polymer materials listed above for the seal body 20. The seal ring 40 can be free of an elastomer.

In certain embodiments, the seal ring 40 can have a Shore D Hardness of at least 47, at least 53, or at least 57. In further embodiments, the seal ring 40 can have a Shore D Hardness of no greater than 73, no greater than 70, or no greater than 67. In yet further embodiments, the seal body 20 can have a Shore D Hardness in a range of any of the above minimum and maximum values, such as 47 to 73, 53 to 70, or 57 to 67.

In certain embodiments, the seal ring 40 can be made from the same material as the seal body 20. Although the dynamics of the seal ring 40 can be different than the dynamics of the seal body 20, the seal body 20 and the seal ring 40 can work best in certain applications when made from the same material.

In certain embodiments, the seal ring 40 can be made from a material that is different than the material used for the seal body 20. In a particular embodiment, the seal ring 40 can be made of a material that has a durometer hardness that is less than the durometer hardness of the seal body 20. For example, the difference between the Shore D Hardness value for the seal ring 40 and the Shore D Hardness value for the seal body 20 can be at least 1, at least 3, or at least 5. In further embodiments, the difference between the Shore D Hardness value for the seal ring 40 and the Shore D Hardness value for the seal body 20 may be no greater than 20, no greater than 15, or no greater than 10. In yet further embodiments, the difference between the Shore D Hardness value for the seal ring 40 and the Shore D Hardness value for the seal body 20 can be in a range of any of the above minimum and maximum values, such as 1 to 20, 3 to 15, or 5 to 10.

The seal assembly 10 can be a dynamic seal assembly for, e.g., linear motion applications, such as the system 100 illustrated in FIG. 2. As illustrated, system 100 can include a housing 150 having a bore 153 with an axis 155, and a gland or recess 160 located in the bore 153. A rod 170 can be coaxially located in the bore 153 for axial motion relative to housing 150. The rod 170 can have an outer surface 173 comprising a dynamic surface relative to housing 150, which has a static surface 157 in the embodiment shown.

take-off run and an effective take-off, an effective flight phase that simulates shock absorbers extended during flight, a landing phase that simulates landing, braking, ending of braking, taxiing, and parking, a rest phase, and a towing phase. As used herein, a seal assembly is considered to have completed one simulated flight cycle of the Flight Cycle Test after completing each of these phases once. The details of each phase of a flight cycle of the Flight Cycle Test are included in Table 1.

TABLE 1

| PHASE | STROKE MM | DESCRIPTION | FREQ Hz | AMPLITUDES mm | PRESSURE Bars | TIME Sec | TOTAL STROKE (mm) |
|---|---|---|---|---|---|---|---|
| 6 | 0 to 390 | Landing | N/A | | 19.5 TO 188.4 | 0.8 | 390 |
| 7 | 390 | Braking | 4 | ±7.5 mm | 188.4 (+29/−22.2) | 20 | 2400 |
| | | | Transition | | | 1 | 30 |
| 8 | 360 | End of Braking | 1 | ±40 | 118.8 (+108.8/−41.6) | 4 | 640 |
| 9 | 360 | Taxi | 2 | ±735 mm | 188.4 (+13.1/−10.4) | 180 | 10800 |
| 10 | 360 | Parking | | | 118.8 | 15 | 0 |
| 11 | 360 | Rest on Ground | | | 118.8 | 180 | 0 |
| | | | Transition | | | 1 | 10 |
| 12 | 370 | Towing | | | 136.3 | 10 | 0 |
| 1 | 370 | Taxi | 2 | ±7.5 | 136.3 (+16.9/−13.1) | 270 | 16200 |
| 2 | 370 | Waiting @ Beginning of Runway | | | 136.3 | 3 | 0 |
| 3 | 370 to 230 | Take Off Run | | | 136.3 to 42.4 | 36 | 140 |
| 4 | 230 to 0 | Effective Take Off | | | 42.4 to 19.5 | 1.3 | 230 |
| 5 | 0 | Shock Absorber Extended During Flight | | | 19.5 | 189 | 0 |

The seal assembly 10 can be located, or adapted to be located, in the recess 160 of the bore 153. The seal assembly 10 can form, or be adapted to form, a seal between the housing 150 and the rod 170. In particular embodiments, the spring 30 can be installed, or adapted to be installed, in the seal body 20 such that the spring 30 biases certain radial portions of the seal body 20 into radial contact with both the housing 150 and the rod 170 for providing a dynamic seal therebetween. In other embodiments, the seal assembly 10 may be configured as a face seal which are commonly used to seal between parallel flat surfaces, swivel couplings and flange-type joints, for example.

In certain embodiments, the seal assembly can be a hydraulic strut seal assembly for aircraft landing gear. That is, the seal assembly can be an aircraft landing gear subcomponent. The hydraulic strut seal assembly can provide a dynamic seal between a housing and a shaft of a hydraulic strut. In certain embodiments, the dynamic seal having a leakage rate of no greater than 0.05 mL per simulated flight cycle for at least 2000 simulated flight cycles, at least 3000 simulated flight cycles, at least 4000 simulated flight cycles, at least 5000 simulated flight cycles, at least 10000 simulated flight cycles, at least 15000 simulated flight cycles, or at least 20000 flight cycles, according to a Flight Cycle Test. The Flight Cycle Test can be performed on a linear actuator test bed including a test bed strut, a test seal at one end of the strut, and a tool seal at the other end of the strut. A simulated flight cycle of the Flight Cycle Test includes a series of phases that simulates the different environments in which the seal will need to operate. The series of phases includes a taxi phase that simulates taxiing and waiting at the beginning of the runway, a take-off phase that simulates a Further, as stated previously, Applicants have developed unique installation methods and tooling that allow for installation of a seal body including a plastic polymer material that limits or avoids such damage during installation. The method of installing the seal body described herein can include providing a housing having a bore with an axis and a blind recess located in the bore; disposing a plastic polymer seal assembly in the blind recess of the bore; and disposing a shaft in the bore for axial motion relative thereto. The installation method can further include providing an installation tool set including a sleeve, a plug, and a pusher. The seal body can be compressed into an oval shape and inserted into the sleeve. The pusher can be inserted into the sleeve and the seal body can be pushed against the plug until the seal body is disposed in the recess of the bore of the housing.

The present disclosure represents a departure from the state of the art. For example, it was previously unknown how to provide a seal assembly for applications such as aircraft landing gear where the seal and the backup ring are made of a plastic polymer material. In addition, it was previously unknown how to install an all-plastic seal having a ratio of radial height to inner diameter of at least 1:20, such as those used in aircraft landing gear. In addition, the sealing assembly described above can demonstrate a synergistic improvement in the combination of number of flight cycles and leakage rate per flight cycles, as illustrated in the following non-limiting examples. Further, Applicants have concurrently developed unique installation methods and tooling that allow for installation of a seal body including a plastic polymer material that limits or avoids such damage during installation.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A seal assembly comprising:
a seal body comprising a first material;
a spring disposed adjacent to the seal body; and
a seal ring comprising a second material,
wherein each of the first material and the second material comprises a plastic polymer material having a Young's modulus of at least 150 MPa.

Item 2. A seal assembly comprising:
a seal body comprising a first material;
a spring disposed adjacent to the seal body; and
a seal ring comprising a second material,
wherein the first material and the second material have the same composition.

Item 3. A hydraulic strut seal assembly adapted to provide a dynamic seal between a housing and a shaft of a hydraulic strut, the dynamic seal having a leakage rate of no greater than 0.05 mL per simulated flight cycle for at least 2000 simulated flight cycles according to a Flight Cycle Test.

Item 4. A system for linear motion, comprising:
a housing having a bore with an axis and a blind recess located in the bore;
a shaft located in the bore for axial motion relative thereto;
a seal assembly comprising a plastic polymer material located in the blind recess of the bore adapted to provide a dynamic seal between the housing and the shaft,
wherein the ratio of a radial height $RH_1$ of the seal assembly to an inner diameter of the seal assembly is less than 1:20.

Item 5. A method of installing a seal assembly, comprising
providing a housing having a bore with an axis and a blind recess located in the bore;
disposing a seal assembly comprising a plastic polymer material in the blind recess of the bore;
disposing a shaft in the bore for axial motion relative thereto;
wherein the ratio of a radial height of the seal assembly to an inner diameter of the seal assembly is less than 1:20.

Item 6. The sealing assembly, system, or method of any one of items 3-5, wherein the seal assembly includes:
a seal body comprising a first material; and
a spring disposed adjacent to the seal body.

Item 7. The sealing assembly, system or method of item 6, wherein the axial height of the seal body $AH_1$ is equal to the total axial height $AH_T$ of the seal assembly.

Item 8. The sealing assembly, system or method of item 6, wherein the seal assembly further includes a seal ring comprising a second material, wherein (1) each of the first and second materials comprises a plastic polymer material having a Young's modulus of at least 150 MPa or (2) the first and second materials are the same.

Item 9. The seal assembly, system, or method of any one of the preceding items, wherein the first material comprises a nylon, a fluoroplastic, a polybenzimidazole (PBI), a polyether ether ketone (PEEK), a polyaryletherketone (PAEK), a polyimide (PI), or any combination thereof.

Item 10. The seal assembly, system, or method of any one of the preceding items, wherein the first material comprises a polyetherimide (PEI).

Item 11. The seal assembly, system, or method of any one of the preceding items, wherein the first material comprises a liquid crystal polymer.

Item 12. The seal assembly, system, or method of any one of the preceding items, wherein the first material comprises a fluoroplastic.

Item 13. The seal assembly, system, or method of item 12, wherein the fluoroplastic includes a polytetrafuoroethylene (PTFE), a perfluoroalkoxy (PFA), a fluorinated ethylene propylene (FEP), a modified PTFE (TFM), an ethylene tetrafluoroethylene (ETFE), a polychlorotrifluoroethene (PCTFE), or any combination thereof.

Item 14. The seal assembly, system, or method of any one of the preceding items, wherein the first material has a Young's Modulus of at least 150 MPa, at least 200 MPa, at least 250 MPa, or at least 300 MPa.

Item 15. The seal assembly, system, or method of any one of the preceding items, wherein the first material has a Young's Modulus of no greater than 1500 MPa, no greater than 1000 MPa, or no greater than 800 MPa.

Item 16. The seal assembly, system, or method of any one of the preceding items, wherein the first material has a Young's Modulus in a range of 150 to 1500 MPa, 200 to 1000 MPa, or 300 to 800 MPa.

Item 17. The seal assembly, system, or method of any one of the preceding items, wherein the second material comprises a nylon, a fluoroplastic, a PBI, a PEEK, a PAEK, a PI, or any combination thereof.

Item 18. The seal assembly, system, or method of any one of the preceding items, wherein the second material comprises a polyetherimide (PEI).

Item 19. The seal assembly, system, or method of any one of the preceding items, wherein the second material comprises a liquid crystal polymer.

Item 20. The seal assembly, system, or method of any one of the preceding items, wherein the second material comprises a fluoroplastic.

Item 21. The seal assembly, system, or method of item 20, wherein the fluoroplastic includes a PTFE, a PFA, a FEP, a TFM, an ETFE, a PCTFE, or any combination thereof.

Item 22. The seal assembly, system, or method of any one of the preceding items, wherein the second material has a Young's Modulus of at least 150 MPa, at least 200 MPa, at least 250 MPa, or at least 300 MPa.

Item 23. The seal assembly, system, or method of any one of the preceding items, wherein the second material has a Young's Modulus of no greater than 1500 MPa, no greater than 1000 MPa, or no greater than 800 MPa.

Item 24. The seal assembly, system, or method of any one of the preceding items, wherein the second material has a Young's Modulus in a range of 150 to 1500 MPa, 200 to 1000 MPa, or 300 to 800 MPa.

Item 25. The seal assembly, system, or method of any one of the preceding items, wherein the first material and the second material are the same.

Item 26. The seal assembly, system, or method of any one of the preceding items, wherein the first material and the second material are different.

Item 27. The seal assembly, system, or method of any one items 1-24 and 26, wherein wherein the Shore D Hardness of the second material is less than the Shore D Hardness of the first material.

Item 28. The seal assembly, system, or method of item 27, wherein the difference in Shore D Hardness values is at least 1, at least 3, or at least 5.

Item 29. The seal assembly, system, or method of items 27 or 28, wherein the difference in Shore D Hardness values is no greater than 20, no greater than 15, or no greater than 10.

Item 30. The seal assembly, system, or method of any one of items 27-29, wherein the difference in Shore D Hardness values is in a range of 1 to 20, 3 to 15, or 5 to 10.

Item 31. The seal assembly, system, or method of any one of the preceding items, wherein the first material is free of an elastomer, the second material is free of an elastomer, or both the first material and the second material are free of an elastomer.

Item 32. The seal assembly, system, or method of any one of the preceding items, wherein the total axial height $AH_T$ of the seal assembly is at least 6 mm, at least 7 mm, at least 8 mm, or at least 9 mm.

Item 33. The seal assembly, system, or method of any one of the preceding items, wherein the total axial height $AH_T$ of the seal assembly is no greater than 20 mm, no greater than 15 mm, or no greater than 11 mm.

Item 34. The seal assembly, system, or method of any one of the preceding items, wherein the total axial height $AH_T$ of the seal assembly in a range of 6 to 20 mm, 7 to 15 mm, or 8 to 11 mm.

Item 35. The seal assembly, system, or method of any one of the preceding items, wherein the seal body has an annular shape.

Item 36. The seal assembly, system, or method of any one of the preceding items, wherein the seal body is concentric with the seal ring.

Item 37. The seal assembly, system, or method of any one of the preceding items, wherein the seal body includes a first portion having a generally rectangular cross-section and a second portion having a generally U-shaped cross-section.

Item 38. The seal assembly, system, or method of any one of the preceding items, wherein the seal body has an inner diameter $ID_1$ of 80 mm, at least 85 mm, or at least 90 mm.

Item 39. The seal assembly, system, or method of any one of the preceding items, wherein the seal body has an inner diameter $ID_1$ of no greater than 150 mm, no greater than 125 mm, or no greater than 115 mm.

Item 40. The seal assembly, system, or method of any one of the preceding items, wherein the seal body has an inner diameter $ID_1$ in a range of 80 to 150 mm, 85 to 125 mm, or 90 to 115 mm.

Item 41. The seal assembly, system, or method of any one of the preceding items, wherein the seal body has a radial height $RH_1$ of at least 1 mm, at least 2 mm, or at least 4 mm.

Item 42. The seal assembly, system, or method of any one of the preceding items, wherein the seal body has a radial height $RH_1$ of no greater than 12 mm, no greater than 10 mm, or no greater than 8 mm.

Item 43. The seal assembly, system, or method of any one of the preceding items, wherein the seal body has a radial height $RH_1$ in a range of 1 to 12 mm, 2 to 10 mm, or 4 to 8 mm.

Item 44. The seal assembly, system, or method of any one of the preceding items, wherein the seal body has a ratio of radial height $RH_1$ to inner diameter $ID_1$ of at least 1:30, at least 1:25, at least 1:20, or at least 1:15.

Item 45. The seal assembly, system, or method of any one of the preceding items, wherein the seal body has a ratio of radial height $RH_1$ to inner diameter $ID_1$ of no greater than 1:5, no greater than 1:7, or no greater than 1:10.

Item 46. The seal assembly, system, or method of any one of the preceding items, wherein the seal body has a ratio of radial height $RH_1$ to inner diameter $ID_1$ in a range of 1:30 to 1:5, 1:25 to 1:7, or 1:20 to 1:10.

Item 47. The seal assembly, system, or method of any one of the preceding items, wherein the seal body has a first major surface defining an inner diameter, the first major surface adapted to engage a shaft and perform a sealing function.

Item 48. The seal assembly, system, or method of item 43, wherein the first major surface of the seal body includes at least one seal groove that extends radially along the first major surface of the seal ring.

Item 49. The seal assembly, system, or method of item 44, wherein the at least one seal groove has opposing asymmetric sidewalls that extend into the thickness of the seal body.

Item 50. The seal assembly, system, or method of any one of items 43-45, wherein the first major surface of the seal body includes at least two repeating seal grooves having opposing asymmetric sidewalls that extend into the thickness of the seal body.

Item 51. The seal assembly, system, or method of any one of the preceding items, wherein the seal body has a contact surface that faces the seal ring.

Item 52. The seal assembly, system, or method of item 47, wherein the contact surface of the seal body is substantially orthogonal to a central axis of the seal body.

Item 53. The seal assembly, system, or method of any one of the preceding items, wherein the seal body has an axial height $AH_1$ of at least 2 mm, at least 4 mm, or at least 6 mm.

Item 54. The seal assembly, system, or method of any one of the preceding items, wherein the seal body has an axial height $AH_1$ of no greater than 14 mm, no greater than 12 mm, or no greater than 10 mm.

Item 55. The seal assembly, system, or method of any one of the preceding items, wherein the seal body has an axial height $AH_1$ in a range of 2 to 14 mm, 4 to 12 mm, or 6 to 10 mm.

Item 56. The seal assembly, system, or method of any one of the preceding items, wherein the spring is adapted to bias a first radial portion of the seal body into radial contact with a housing and to bias a second radial portion of the seal body into radial contact with a shaft for providing a dynamic seal therebetween.

Item 57. The seal assembly, system, or method of any one of the preceding items, wherein the spring is free of direct contact with the seal ring.

Item 58. The seal assembly, system, or method of any one of the preceding items, wherein the spring is disposed in an annular opening of the seal body in an axial direction.

Item 59. The seal assembly, system, or method of item 54, wherein the spring has an apex that abuts an inner, concave surface the annular opening of the seal body.

Item 60. The seal assembly, system, or method of any one of the preceding items, wherein the spring comprises a metal.

Item 61. The seal assembly, system, or method of any one of the preceding items, wherein the spring is die-formed from an overlapped metal strip and configured with U-shaped cantilevers.

Item 62. The seal assembly, system, or method of any one of the preceding items, wherein the seal ring has a generally rectangular cross-section.

Item 63. The seal assembly, system, or method of any one of the preceding items, wherein the seal ring has an inner diameter $ID_2$ of at least 80 mm, at least 85 mm, at least 90 mm.

Item 64. The seal assembly, system, or method of any one of the preceding items, wherein the seal ring has an inner diameter $ID_2$ of no greater than 150 mm, no greater than 125 mm, or no greater than 115 mm.

Item 65. The seal assembly, system, or method of any one of the preceding items, wherein the seal ring has an inner diameter $ID_2$ of from 80 to 150 mm, from 85 to 125 mm, from 90 to 115 mm.

Item 66. The seal assembly, system, or method of any one of the preceding items, wherein the seal ring has an inner diameter $ID_2$ that is substantially the same as an inner diameter $ID_1$ of the seal body.

Item 67. The seal assembly, system, or method of any one of the preceding items, wherein the seal ring has a radial height $RH_2$ of at least 1 mm, at least 2 mm, or at least 4 mm.

Item 68. The seal assembly, system, or method of any one of the preceding items, wherein the seal ring has a radial height $RH_2$ of no greater than 12 mm, no greater than 10 mm, or no greater than 8 mm.

Item 69. The seal assembly, system, or method of any one of the preceding items, wherein the seal ring has a radial height $RH_2$ in a range of 1 to 12 mm, 2 to 10 mm, or 4 to 8 mm.

Item 70. The seal assembly, system, or method of any one of the preceding items, wherein the seal ring has a radial height $RH_2$ that is substantially the same as a radial height $RH_1$ of the seal body.

Item 71. The seal assembly, system, or method of any one of the preceding items, wherein the seal body has a ratio of radial height $RH_2$ to inner diameter $ID_2$ of at least 1:30, at least 1:25, at least 1:20, or at least 1:15.

Item 72. The seal assembly, system, or method of any one of the preceding items, wherein the seal body has a ratio of radial height $RH_2$ to inner diameter $ID_2$ of no greater than 1:5, no greater than 1:7, or no greater than 1:10.

Item 73. The seal assembly, system, or method of any one of the preceding items, wherein the seal body has a ratio of radial height $RH_2$ to inner diameter $ID_2$ in a range of 1:30 to 1:5, 1:25 to 1:7, or 1:20 to 1:10.

Item 74. The seal assembly, system, or method of any one of the preceding items, wherein the seal ring has a ratio of radial height $RH_2$ to inner diameter $ID_2$ that is substantially the same as a ratio of radial height $RH_1$ to inner diameter $ID_1$ of the seal body.

Item 75. The seal assembly, system, or method of any one of the preceding items, wherein the seal ring has a first major surface defining an inner diameter, the first major surface adapted to engage a shaft and perform a sealing function.

Item 76. The seal assembly, system, or method of item 71, wherein the first major surface of the seal ring includes at least one seal groove that extends radially along the first major surface of the seal ring.

Item 77. The seal assembly, system, or method of item 72, wherein the at least one seal groove has opposing asymmetric sidewalls that extend into the thickness of the seal ring.

Item 78. The seal assembly, system, or method of any one of items 71-73, wherein the first major surface includes at least two seal grooves having bilateral symmetry with each other.

Item 79. The seal assembly, system, or method of any one of the preceding items, wherein the seal ring has a contact surface that faces the seal body.

Item 80. The seal assembly, system, or method of item 75, wherein the contact surface is substantially orthogonal to a central axis of the seal ring.

Item 81. The seal assembly, system, or method of any one of the preceding items, wherein the seal ring has an axial height $A_{H2}$ of least 1 mm, at least 1.5 mm, or at least 2 mm.

Item 82. The seal assembly, system, or method of any one of the preceding items, wherein the seal ring has an axial height $A_{H2}$ of no greater than 6 mm, no greater than 5 mm, or no greater than 4 mm.

Item 83. The seal assembly, system, or method of any one of the preceding items, wherein the seal ring has an axial height $A_{H2}$ in a range of 1 to 6 mm, 1.5 to 5 mm, or 2 to 4 mm.

Item 84. The seal assembly, system, or method of any one of the preceding items, wherein the seal assembly is adapted to provide a dynamic seal between the housing and the shaft, the dynamic seal having a leakage rate of no greater than 0.05 mL per flight cycle for at least 2000 simulated flight cycles, at least 3000 simulated flight cycles, at least 4000 simulated flight cycles, at least 5000 simulated flight cycles, at least 10000 simulated flight cycles, at least 15000 simulated flight cycles, or at least 20000 simulated flight cycles according to a Flight Cycle Test.

Item 85. The method of any one of the preceding items, wherein disposing the seal assembly in the recess of the bore for sealing between the housing and the shaft includes:

providing an installation tool set including a sleeve, a plug, and a pusher.

Item 86. The method of item 74, wherein disposing the seal assembly in the recess of the bore for sealing between the housing and the shaft further includes:

compressing the seal body into an oval shape and inserting the ovoid seal into the sleeve.

Item 87. The method of item 75, wherein disposing the seal assembly in the recess of the bore for sealing between the housing and the shaft further includes:

inserting the pusher into the sleeve and push the seal body against the plug until the seal body is disposed in the recess of the bore of the housing.

Item 88. A hydraulic strut comprising the system or seal assembly of any one of the preceding items.

Item 89. An aircraft landing gear subcomponent comprising the seal assembly of any one of the preceding items.

Item 90. The seal assembly, system, or method of any one of the preceding items, wherein the seal assembly is adapted for a hydraulic strut having a bore including a groove adjacent the seal assembly groove on a low pressure atmospheric side of the bore.

EXAMPLES

Example 1

An embodiment of the seal assembly described herein was tested and compared to a conventional seal assembly. Comparative Sample 1 was a conventional seal assembly (available under the trade name Turcon Hat Seal II from Trelleborg Sealing Solutions in Fort Wayne, Ind.), which includes a molded elastomer ring that energizes a polytetrafluoroethylene (PTFE) platform. Sample 2 was an embodiment of the seal assembly described herein including a seal body, a spring, and a seal ring. The seal body comprised a fluorplastic material available under the trade name Fluoroloy A21 (from Saint-Gobain Performance Plastics in Garden Grove, Calif.), the spring comprised a metal material available under the trade name Egiloy (from Saint-Gobain in Garden Grove, Calif.), and the seal ring comprised a fluoroplastic material available under the trade name Fluoroloy A68 (from Saint-Gobain Performance Plastics in Garden Grove, Calif.).

Each of the Comparative Sample 1 and Sample 2 had a radial height of about 0.2 inches and an inner diameter of about 3.7 inches, and were subjected to the Flight Cycle Test described above. The results of the tests are described below in Table 2.

TABLE 2

| Sample | Leakage Rate | Cycles Completed |
|---|---|---|
| Comparative Sample 1 | 0.011 mL/cycle | 1100 |
| Sample 2 | 0.0057 mL/cycle | 20000 |

As shown by the results listed in Table 2, the seal assembly according to an embodiment of the seal assembly described herein was able to complete almost 20 times more cycles than the conventional seal assembly. In addition, the seal assembly according to an embodiment of the seal assembly described herein completed those cycles with about half the leakage rate of the conventional seal assembly.

Example 2

Example 2 tests the installation of sample seal assemblies in the hydraulic strut of the Nose Landing Gear for the Airbus A318-A320 aircrafts (strut available from Messier-Bugatti-Dowty in Vélizy-Villacoublay, France) having multiple grooves and an bore depth of approximately 5 inches.

Samples 3 and 4 are substantially the same seal assembly as Sample 2 of Example 1. Sample 3 is installed using traditional methods, such as by bending, folding, pushing down the bore and fitting into a groove by hand aided by pry bar. Sample 4 is installed using the tooling and installation method of this disclosure.

Sample 3 exhibits a crease in the seal body and the spring is deformed from the twisting required to install the seal assembly. In addition, the groove in the strut adjacent the installation groove and its sharp edges engage and damage the seal body. The damage to the seal assembly indicates that the Sample 3 installation fails.

Sample 4 shows no signs of damage on the seal body or the spring. The seal assembly is not twisted and does not engage the adjacent grooves of the strut. The lack of damage to the seal indicates that the Sample 4 installation passes.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A system for linear motion, comprising:
   a housing having a bore with an axis and a blind recess located in the bore;
   a shaft located in the bore for axial motion relative thereto;
   a seal assembly comprising a plastic polymer material located in the blind recess of the bore adapted to provide a dynamic seal between the housing and the shaft,
   the seal assembly comprising a seal body comprising a first material, and a seal ring comprising a second material, wherein the seal body comprises a plurality of seal ring grooves extending radially along a first major surface of the seal body, and wherein the seal ring is generally rectangular in a cross-section substantially orthogonal to a central axis of the seal ring, wherein the seal ring comprises at least two repeating seal ring grooves extending radially along the major surface of the seal ring and having opposing asymmetric sidewalls that extend into a thickness of the seal ring, wherein each of the first material and the second material comprises a plastic polymer material having a Young's modulus of at least 150 MPa, wherein the seal body comprises a contact surface having a substantially flat surface adapted to contact the seal ring, wherein the seal ring has a radial height $RH_2$ that is substantially the same as a radial height $RH_1$ of the seal body.

2. The system for linear motion of claim 1, wherein the seal assembly includes:
   a spring disposed adjacent to the seal body and adapted to bias a radial portion of the seal body.

3. The system for linear motion of claim 2, wherein the axial height of the seal body $AH_1$ is equal to the total axial height $AH_T$ of the seal assembly.

4. The system for linear motion of claim 2, wherein (1) each of the first and second materials comprises a plastic polymer material having a Young's modulus of at least 150 MPa or (2) the first and second materials are the same.

5. The system for linear motion of claim 2, wherein the first material comprises a nylon, a fluoroplastic, a polybenzimidazole (PBI), a polyether ether ketone (PEEK), a polyaryletherketone (PAEK), a polyimide (PI), or any combination thereof.

6. The system for linear motion of claim 5, wherein the first material comprises a fluoroplastic including a polytetrafluoroethylene (PTFE), a perfluoroalkoxy (PFA), a fluorinated ethylene propylene (FEP), a modified PTFE (TFM), an ethylene tetrafluoroethylene (ETFE), a polychlorotrifluoroethene (PCTFE), or any combination thereof.

7. The system for linear motion of claim 2, wherein the first material has a Young's Modulus in a range of 150 to 1500 MPa.

8. The system for linear motion of claim 4, wherein the second material comprises a nylon, a fluoroplastic, a PBI, a PEEK, a PAEK, a PI, or any combination thereof.

9. The system for linear motion of claim 8, wherein the first material comprises a fluoroplastic including a polytetrafuoroethylene (PTFE), a perfluoroalkoxy (PFA), a fluorinated ethylene propylene (FEP), a modified PTFE (TFM), an ethylene tetrafluoroethylene (ETFE), a polychlorotrifluoroethene (PCTFE), or any combination thereof.

10. The system for linear motion of claim 4, wherein the second material has a Young's Modulus in a range of 150 to 1500 MPa.

11. The system for linear motion of claim 4, wherein the first material and the second material are the same.

12. The system for linear motion of claim 4, wherein the Shore D Hardness of the second material is less than the Shore D Hardness of the first material.

13. The system for linear motion of claim 4, wherein the first material is free of an elastomer, the second material is free of an elastomer, or both the first material and the second material are free of an elastomer.

14. The system for linear motion of claim 4, wherein the seal body has a contact surface that faces the seal ring.

15. The system for linear motion of claim 2, wherein the seal body has a ratio of radial height $RH_1$ to inner diameter $ID_1$ in a range of 1:30 to 1:5.

16. The system for linear motion of claim 2, wherein the seal body or seal ring has a first major surface defining an inner diameter, the first major surface adapted to engage a shaft and perform a sealing function.

17. A method of installing a seal assembly, comprising
providing a housing having a bore with an axis and a blind recess located in the bore;
disposing a seal assembly comprising a plastic polymer material in the blind recess of the bore;
disposing a shaft in the bore for axial motion relative thereto;
the seal assembly comprising a seal body comprising a first material, and a seal ring comprising a second material, wherein the seal ring is generally rectangular in a cross-section sustantially orthogonal to a central axis of the seal ring, wherein the seal ring comprises a plurality of seal ring grooves extending radially along a first major surface of the seal body, and wherein the seal ring comprises at least two repeating seal ring grooves extending radially along the major surface of the seal ring and having opposing asymmetric sidewalls that extend into a thickness of the seal ring, wherein each of the first material and the second material comprises a plastic polymer material having a Young's modulus of at least 150 MPa, wherein the seal body comprises a contact surface having a substantially flat surface adapted to contact the seal ring, wherein the seal ring has a radial height $RH_2$ that is substantially the same as a radial height $RH_1$ of the seal body.

* * * * *